US009317293B2

(12) United States Patent
Dieffenderfer et al.

(10) Patent No.: US 9,317,293 B2
(45) Date of Patent: Apr. 19, 2016

(54) ESTABLISHING A BRANCH TARGET INSTRUCTION CACHE (BTIC) ENTRY FOR SUBROUTINE RETURNS TO REDUCE EXECUTION PIPELINE BUBBLES, AND RELATED SYSTEMS, METHODS, AND COMPUTER-READABLE MEDIA

(71) Applicant: QUALCOMM Incorporated, San Diego, CA (US)

(72) Inventors: James Norris Dieffenderfer, Apex, NC (US); Michael William Morrow, Wilkes-Barre, PA (US); Michael Scott McIlvaine, Raleigh, NC (US); Daren Eugene Streett, Cary, NC (US); Vimal K. Reddy, Raleigh, NC (US); Brian Michael Stempel, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 13/792,335

(22) Filed: Mar. 11, 2013

(65) Prior Publication Data
US 2014/0149726 A1    May 29, 2014

Related U.S. Application Data

(60) Provisional application No. 61/730,717, filed on Nov. 28, 2012.

(51) Int. Cl.
*G06F 9/38* (2006.01)
*G06F 9/30* (2006.01)

(52) U.S. Cl.
CPC .......... *G06F 9/3808* (2013.01); *G06F 9/30054* (2013.01)

(58) Field of Classification Search
CPC .............................. G06F 9/30054; G06F 9/3808
See application file for complete search history.

(56) References Cited

U.S. PATENT DOCUMENTS

| 5,561,782 | A  | 10/1996 | O'Connor |
| 5,623,614 | A  | 4/1997  | Van Dyke et al. |
| 6,279,106 | B1 | 8/2001  | Roberts |
| 7,159,098 | B2 | 1/2007  | Henry et al. |
| 7,447,883 | B2 | 11/2008 | Vasekin et al. |
| 2005/0172110 | A1 | 8/2005 | Hirotsu et al. |
| 2008/0301420 | A1 | 12/2008 | Inoue |
| 2009/0210661 | A1 | 8/2009  | Alexander et al. |

FOREIGN PATENT DOCUMENTS

| EP | 0468134 A2 | 1/1992 |
| EP | 1868081 A1 | 12/2007 |
| WO | 9114224 A1 | 9/1991 |

OTHER PUBLICATIONS

International Search Report and Written Opinion—PCT/US2013/072372, International Search Authority—European Patent Office, Feb. 6, 2014.

*Primary Examiner* — Benjamin Geib
(74) *Attorney, Agent, or Firm* — Gerald P. Joyce, III

(57) ABSTRACT

Establishing a branch target instruction cache (BTIC) entry for subroutine returns to reduce pipeline bubbles, and related systems, methods, and computer-readable media are disclosed. In one embodiment, a method of establishing a BTIC entry includes detecting a subroutine call in an execution pipeline. In response, at least one instruction fetched sequential to the subroutine call is written as a branch target instruction in a BTIC entry for a subroutine return. A next instruction fetch address is calculated, and is written into a next instruction fetch address field in the BTIC entry. In this manner, the BTIC may provide correct branch target instruction and next instruction fetch address data for the subroutine return, even if the subroutine return is encountered for the first time or the subroutine is called from different calling locations.

28 Claims, 10 Drawing Sheets

ESTABLISHING A BRANCH TARGET INSTRUCTION CACHE (BTIC) ENTRY FOR SUBROUTINE RETURNS TO REDUCE EXECUTION PIPELINE BUBBLES, AND RELATED SYSTEMS, METHODS, AND COMPUTER-READABLE MEDIA

PRIORITY APPLICATION

The present application claims priority to U.S. Provisional Patent Application Ser. No. 61/730,717 filed on Nov. 28, 2012 and entitled "ESTABLISHING A BRANCH TARGET INSTRUCTION CACHE (BTIC) ENTRY FOR SUBROUTINE RETURNS TO REDUCE EXECUTION PIPELINE STALLS, AND RELATED SYSTEMS, METHODS, AND COMPUTER-READABLE MEDIA," which is hereby incorporated herein by reference in its entirety.

BACKGROUND

I. Field of the Disclosure

The technology of the disclosure relates to branch prediction in computer systems, and more particularly to branch target buffers (BTBs) and/or branch target instruction caches (BTICs).

II. Background

Instruction pipelining is a processing technique whereby the throughput of computer instructions being executed by a processor may be increased by splitting the handling of each instruction into a series of steps, and executing the steps in an execution pipeline composed of multiple stages. Optimal processor performance may be achieved if all stages in an execution pipeline are able to process instructions concurrently without incurring a pipeline "bubble" when instruction redirection occurs. Instructions processed within an execution pipeline may include branch instructions, which redirect the flow of a program by transferring program control to a specified branch target instruction. If a branch instruction is conditional, (i.e., it is not known whether the branch will be taken until execution), branch prediction hardware may be employed to predict whether the branch will be taken based on resolution of previously executed conditional branch instructions.

In a conventional execution pipeline, instructions following a branch instruction are fetched into the execution pipeline concurrently with decoding the branch instruction. Accordingly, when a branch is predicted to be taken, the instructions that were fetched sequential to the branch instruction (i.e., the instructions that would be executed if the branch were not taken) are flushed. The correct branch target instructions are then fetched. This process is typically referred to as an instruction fetch redirect. Because the instruction fetch redirect may consume one or more clock cycles, one or more pipeline bubbles may be introduced into the execution pipeline at the point where the decode stage idles while the branch target instructions are fetched. Once introduced, a pipeline bubble propagates through subsequent stages of the execution pipeline.

To reduce the frequency of pipeline bubbles, a branch target instruction cache (BTIC) may be utilized. A BTIC stores copies of one or more branch target instructions (i.e., instruction(s) at a target address to which a branch instruction transfers program control when the branch is taken). Branch target instructions cached in the BTIC may be partially or fully decoded. The BTIC may also cache a next instruction fetch address for fetching one or more next subsequent instructions after a cached branch target instruction. The BTIC is typically consulted during the fetch stage of the execution pipeline, and provides branch target instruction(s) to one or more subsequent stages of an execution pipeline to reduce or eliminate an occurrence of a pipeline bubble introduced as a result of an instruction fetch redirect.

A BTIC entry is established for a branch instruction when the branch instruction is recognized and the branch is first taken. Consequently, when a branch instruction is encountered for the first time, a BTIC entry does not exist for the branch instruction, and a BTIC cache "miss" occurs. In the particular case of a subroutine return instruction (a specific type of branch instruction), when the subroutine return instruction is first encountered, the subroutine return instruction will always experience a BTIC cache miss. It is desirable for a BTIC entry corresponding to the subroutine return instruction to provide correct branch target instructions when the subroutine return instruction is first encountered.

Moreover, because a subroutine may be called from multiple branch instructions at different points within a program, a BTIC entry for a subroutine return instruction may frequently contain incorrect branch target instructions. For example, when a subroutine that is called from a first calling location returns, the instructions sequential to the first calling location are executed and are populated in the BTIC entry for the subroutine return instruction as branch target instructions. If the subroutine is subsequently called from a second calling location, the instructions sequential to the second calling location should be executed after the subroutine returns. However, the branch target instructions cached in the BTIC entry for the subroutine return instruction are instructions following the first calling location, not instructions following the second calling location. Thus, the subroutine return instruction's BTIC entry does not contain correct branch target instructions for the second calling location. It is desirable for the subroutine return instruction's BTIC entry to provide correct branch target instructions, even after the subroutine is called from a different calling location.

SUMMARY OF THE DISCLOSURE

Embodiments of the disclosure provide establishing a branch target instruction cache (BTIC) entry for a subroutine return instruction to reduce execution pipeline bubbles. Related systems, methods, and computer-readable media are also disclosed. Conventionally, in response to detection of a branch instruction that is predicted to be taken, instructions sequential to the branch instruction (in program order) that have been already been fetched are flushed from an execution pipeline. However, when the branch instruction is a subroutine call instruction, those flushed sequential instructions are likely to be the branch target instructions for a subroutine return instruction that will transfer program control back from the subroutine called by the subroutine call instruction. Accordingly, embodiments disclosed herein provide establishing a BTIC entry for the subroutine return instruction in response to detecting the subroutine call instruction. In this manner, the BTIC may provide a valid BTIC entry for the subroutine return instruction when the subroutine return instruction is first encountered. Furthermore, the BTIC entry may provide correct branch target instructions for the subroutine return instruction, even when the subroutine is called from a calling location different from a prior calling location.

In this regard, in one embodiment, a method of establishing a BTIC entry for a subroutine return instruction in an execution pipeline to reduce an occurrence of an execution pipeline bubble is provided. The method comprises detecting a subroutine call instruction in an execution pipeline. In response to detecting the subroutine call instruction, the method further comprises establishing a BTIC entry for a subroutine return instruction by writing at least one sequential instruction fetched sequential to the subroutine call instruction as a branch target instruction in the BTIC entry for the subroutine return instruction. The method also comprises calculating a next instruction fetch address. The method additionally comprises writing the next instruction fetch address into a next instruction fetch address field in the BTIC entry for the subroutine return instruction. In this manner, the BTIC may provide correct branch target instruction and next instruction fetch address data for the subroutine return instruction, even if the subroutine return instruction is encountered for the first time or the subroutine is called from a calling location different from a prior calling location.

In another embodiment, a pipeline bubble reduction circuit is provided. The pipeline bubble reduction circuit comprises a subroutine call detection circuit configured to detect a subroutine call instruction in an execution pipeline. The pipeline bubble reduction circuit further comprises a BTIC entry establishing circuit configured to, in response to the subroutine call detection circuit detecting the subroutine call instruction, write at least one sequential instruction fetched sequential to the subroutine call instruction as a branch target instruction in a BTIC entry for a subroutine return instruction. The BTIC entry establishing circuit is further configured to calculate a next instruction fetch address. The BTIC establishing circuit is also configured to write the next instruction fetch address into a next instruction fetch address field in the BTIC entry for the subroutine return instruction.

In an additional embodiment, a pipeline bubble reduction circuit is provided. The pipeline bubble reduction circuit comprises a means for detecting a subroutine call instruction in an execution pipeline. The pipeline bubble reduction circuit further comprises a means for establishing a BTIC entry for a subroutine return instruction in response to detecting the subroutine call instruction. The means for establishing the BTIC entry comprises a means for writing at least one sequential instruction fetched sequential to the subroutine call instruction as a branch target instruction in the BTIC entry for the subroutine return instruction in response to detecting the subroutine call instruction. The means for establishing the BTIC entry also comprises a means for calculating a next instruction fetch address in response to detecting the subroutine call instruction. The means for establishing the BTIC entry additionally comprises a means for writing the next instruction fetch address into a next instruction fetch address field in the BTIC entry for the subroutine return instruction in response to detecting the subroutine call instruction.

In an additional embodiment, a non-transitory computer-readable medium is provided, having stored thereon computer-executable instructions to cause a processor to implement a method of establishing a BTIC entry for a subroutine return instruction in an execution pipeline to reduce an occurrence of a pipeline bubble. The method implemented by the computer-executable instructions comprises detecting a subroutine call instruction in an execution pipeline. The method implemented by the computer-executable instructions further comprises, in response to detecting the subroutine call instruction, establishing the BTIC entry for a subroutine return instruction by writing at least one sequential instruction fetched sequential to the subroutine call instruction as a branch target instruction in the BTIC entry for the subroutine return instruction. The method implemented by the computer-executable instructions also comprises calculating a next instruction fetch address. The method implemented by the computer-executable instructions additionally comprises writing the next instruction fetch address into a next instruction fetch address field in the BTIC entry for the subroutine return instruction.

DETAILED DESCRIPTION

Figure 1:
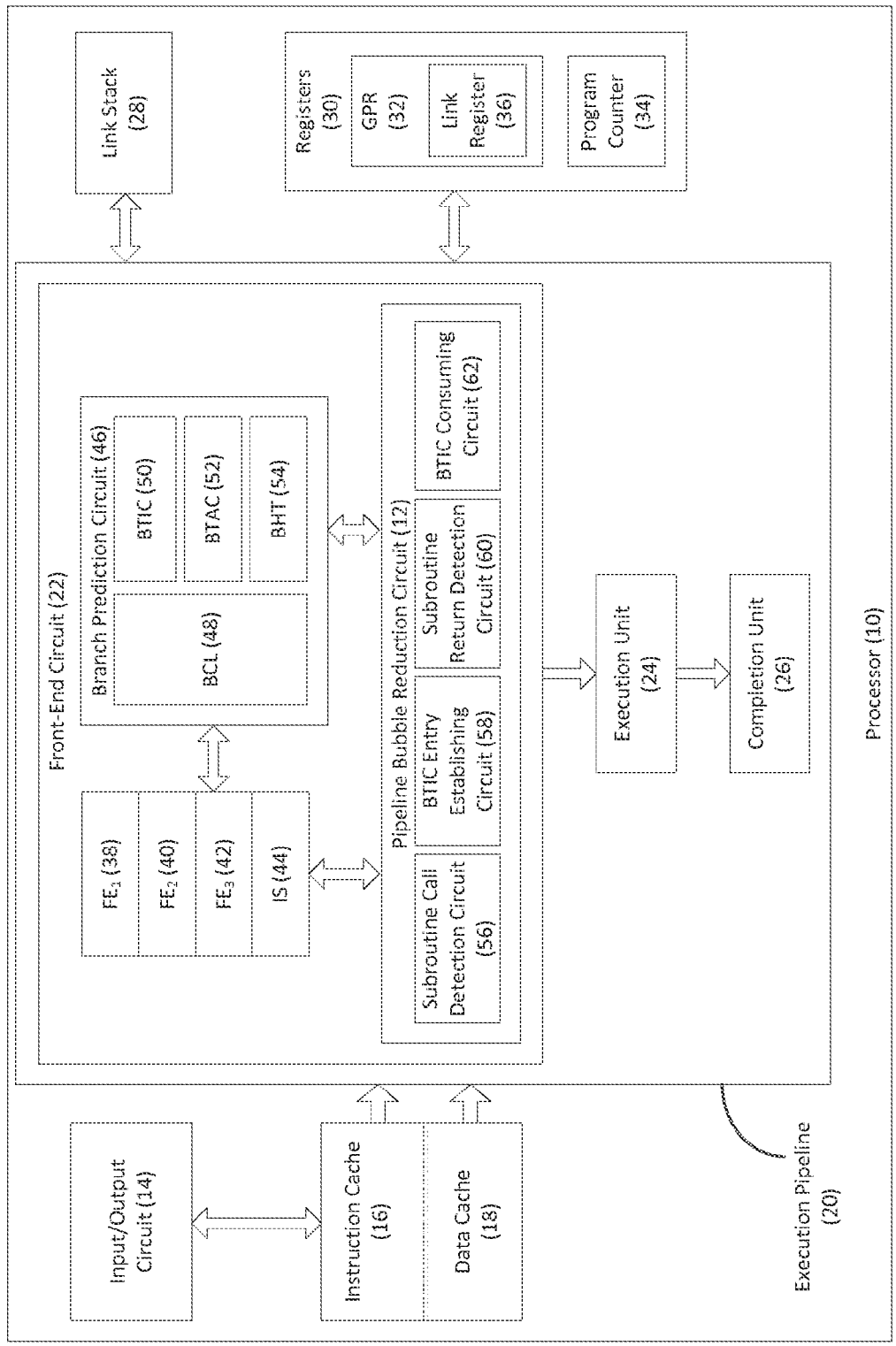
FIG. 1 is a block diagram of an exemplary processor that includes a pipeline bubble reduction circuit configured to establish a branch target instruction cache (BTIC) entry for a subroutine return instruction to reduce an occurrence of execution pipeline bubbles.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of the disclosure provide establishing a branch target instruction cache (BTIC) entry for a subroutine return instruction to reduce execution pipeline bubbles. Related systems, methods, and computer-readable media are also disclosed. Conventionally, in response to detection of a branch instruction that is predicted to be taken, instructions sequential to the branch instruction (in program order) that have been already been fetched are flushed from an execution pipeline. However, when the branch instruction is a subroutine call instruction, those flushed sequential instructions are likely to be the branch target instructions for a subroutine return instruction that will transfer program control back from the subroutine called by the subroutine call instruction. Accordingly, embodiments disclosed herein provide establishing a BTIC entry for the subroutine return instruction in response to detecting the subroutine call instruction. In this manner, the BTIC may provide a valid BTIC entry for the subroutine return instruction when the subroutine return instruction is first encountered. Furthermore, the BTIC entry may provide correct branch target instructions for the subroutine return instruction, even when the subroutine is called from a calling location different from a prior calling location.

In this regard, in one embodiment, a method of establishing a BTIC entry for a subroutine return instruction in an execution pipeline to reduce an occurrence of an execution pipeline bubble is provided. The method comprises detecting a subroutine call instruction in an execution pipeline. In response to detecting the subroutine call instruction, the method further comprises establishing the BTIC entry for a subroutine return instruction by writing at least one sequential instruction fetched sequential to the subroutine call instruction as a branch target instruction in the BTIC entry for the subroutine return instruction. The method also comprises calculating a next instruction fetch address. The method additionally comprises writing the next instruction fetch address into a next instruction fetch address field in the BTIC entry for the subroutine return instruction. In this manner, the BTIC may provide correct branch target instruction and next instruction fetch address data for the subroutine return instruction, even if the subroutine return instruction is encountered for the first time or the subroutine is called from a calling location different from a prior calling location.

In this regard, FIG. 1 is a block diagram of an exemplary processor 10. The processor 10 includes a pipeline bubble reduction circuit 12 configured to establish a BTIC entry (not shown) for a subroutine return instruction to reduce an occurrence of a pipeline bubble. The processor 10 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor dies or packages. The processor 10 includes an input/output (I/O) circuit 14, an instruction cache 16, and a data cache 18. The processor 10 further comprises an execution pipeline 20, which includes a front-end circuit 22, an execution unit 24, and a completion unit 26. The processor 10 additionally includes a link stack 28 as well as registers 30, which comprise one or more general purpose registers (GPR) 32, a program counter 34, and a link register 36. In some embodiments, such as those employing the ARM v7 architecture, the link register 36 is one of the GPRs 32, as shown in FIG. 1. Alternately, some embodiments, such as those utilizing a PowerPC architecture, may provide that the link register 36 is separate from the GPRs 32 (not shown).

In exemplary operation, the front-end circuit 22 of the execution pipeline 20 fetches instructions from the instruction cache 16. In most embodiments, the instruction cache 16 may be an on chip Level 1 (L1) cache, as a non-limiting example. The fetched instructions are decoded by the front-end circuit 22 and issued to the execution unit 24. The execution unit 24 executes the issued instructions, and the completion unit 26 retires the executed instructions. In some embodiments, the completion unit 26 may comprise a writeback mechanism that stores the execution results in one or more targeting file registers. It is to be understood that the execution unit 24 and/or the completion unit 26 may each comprise one or more sequential pipeline stages. It is to be further understood that instructions may be fetched and/or decoded in groups of more than one.

In some embodiments, the processor 10 may employ branch prediction, the exemplary operation of which is now described. The front-end circuit 22 comprises pipeline stages including sequential fetch/decode pipeline stages 38, 40, and 42 (referred to herein as $FE_1$, $FE_2$, and $FE_3$, respectively), and an issue/dispatch stage 44. One or more of the pipeline stages 38, 40, and 42 are associated with a branch prediction circuit 46 comprising a branch control logic (BCL) circuit 48, a branch target instruction cache (BTIC) 50, a branch target address cache (BTAC) 52, and a branch history table (BHT) 54.

The pipeline bubble reduction circuit 12 of the processor 10 includes a subroutine call detection circuit 56, a BTIC entry establishing circuit 58, a subroutine return detection circuit 60, and a BTIC consuming circuit 62. Operations performed by these elements of the pipeline bubble reduction circuit 12 to establish BTIC entry for subroutine return instructions to reduce execution pipeline bubbles are discussed in more detail below. In some embodiments, the BTIC entry establishing circuit 58 and/or the BTIC consuming circuit 62 may utilize logic or functionality provided in part by the BTIC 50.

Figure 2:
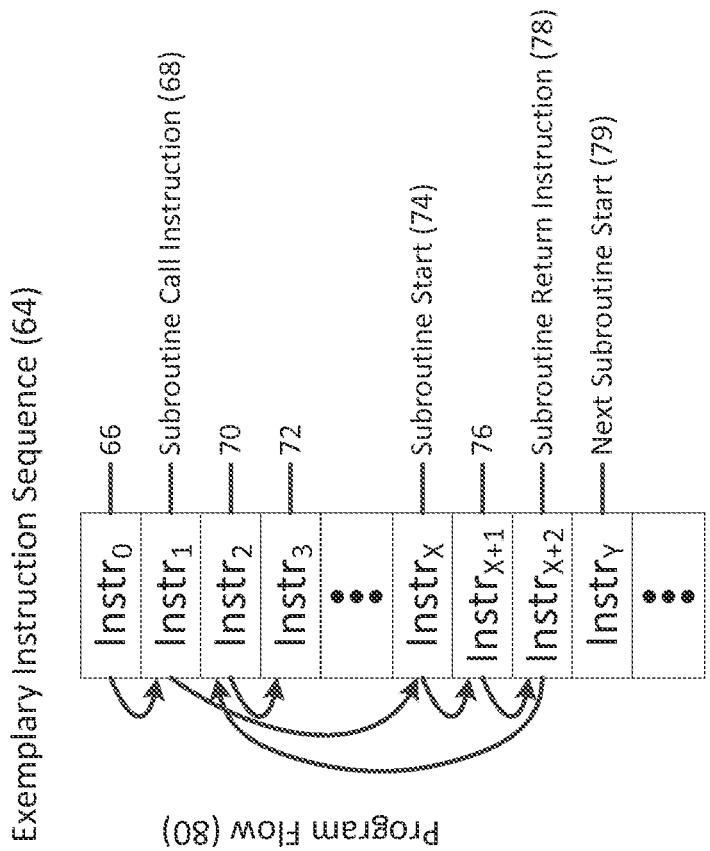
FIG. 2 is a diagram providing an exemplary instruction sequence that may be processed by the execution pipeline bubble reduction circuit of FIG. 1.

Before examples of methods, systems, and computer-readable media for establishing a BTIC entry for subroutine return instructions are described, the operation of a conventional BTIC is first described. To simplify the examples discussed below, an exemplary instruction sequence 64 representing a typical series of instructions that may be processed by the execution pipeline 20 of FIG. 1 is provided in FIG. 2. The exemplary instruction sequence 64 comprises instructions 66, 68, 70, 72, 74, 76, 78, and 79, referred to herein as $Instr_0$, $Instr_1$, $Instr_2$, $Instr_3$, $Instr_X$, $Instr_{X+1}$, $Instr_{X+2}$, and $Instr_Y$, respectively. The order in which the above-referenced instructions appear in FIG. 2 represents the sequential order in which the instructions are stored within a persistent storage medium, such as a hard drive or flash memory. However, as the instructions are executed by the processor 10, program control may be transferred from one location to another by instructions such as branch instructions. As a result, the actual order in which the instructions are fetched and executed by the processor 10 may vary from the sequence in which the instructions are stored.

In FIG. 2, a transfer of program control during execution of the instructions is illustrated by arrows of a program flow 80. As indicated by the program flow 80, program execution begins with instruction $Instr_0$ and proceeds to $Instr_1$, which in this example is a subroutine call instruction. In some embodiments, subroutine call instructions may include a branch-and-link (BL) instruction that places a return address of the subroutine call instruction into a link register, such as the link register 36 of FIG. 1, and sets a program counter, such as the program counter 34 of FIG. 1, to an instruction address of a subroutine. Here, the subroutine call instruction $Instr_1$ causes program control to be transferred to the instruction $Instr_X$, which is a subroutine start instruction.

Next, the instructions $Instr_{X+1}$ and $Instr_{X+2}$ are fetched and executed in sequence. $Instr_{X+2}$ is a subroutine return instruction, which is a branch instruction that causes program control to return to the instruction sequential to the subroutine call instruction that called the subroutine. Some embodiments may provide that a subroutine return instruction is a branch-to-link (BLR) instruction that sets a program counter, such as the program counter 34 of FIG. 1, to a return address of the subroutine call instruction. In this example, execution of the instruction $Instr_{X+2}$ transfers program control to the instruction $Instr_2$, the instruction immediately following the subroutine call instruction $Instr_1$. Processing of the instructions then proceeds sequentially, with the instruction $Instr_3$ and any following instructions fetched and executed in order. As shown in FIG. 2, the instruction $Instr_Y$ represents a starting point of a next subroutine. Although the instruction $Instr_Y$ immediately follows the subroutine return instruction $Instr_{X+2}$, the instruction $Instr_Y$ and subsequent instructions are not executed unless called by another branch instruction within the program (not shown).

Figure 3:
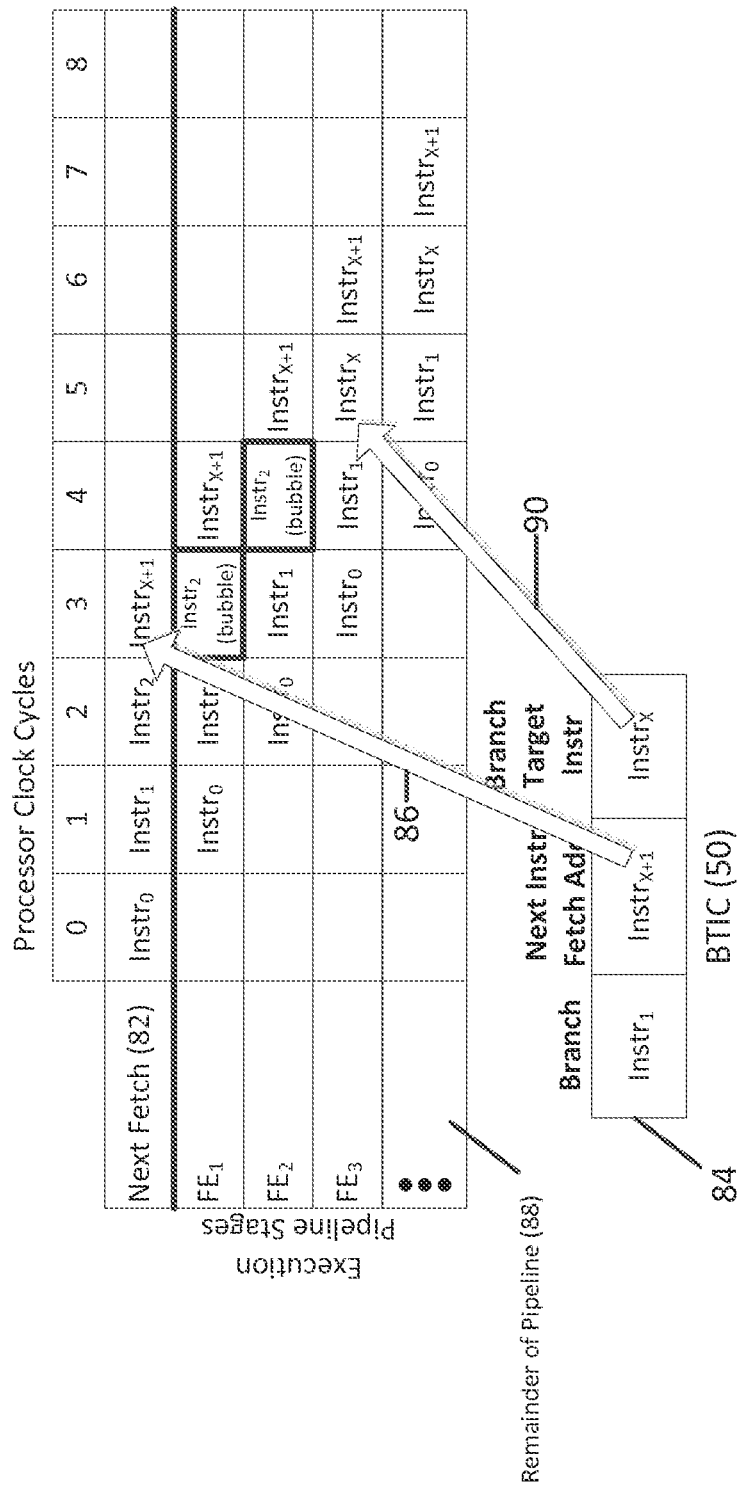
FIG. 3 is a timing diagram illustrating the exemplary instruction sequence of FIG. 2 being processed by the exemplary processor of FIG. 1 utilizing a BTIC, showing an exemplary occurrence of a pipeline bubble as a result of encountering a predicted taken branch, and elimination of the pipeline bubble using the pipeline bubble reduction circuit of FIG. 1.

FIG. 3 is provided to more clearly illustrate an exemplary occurrence of an execution pipeline bubble as a result of encountering a predicted taken branch, and use of a BTIC to eliminate the pipeline bubble. FIG. 3 is a timing diagram showing the exemplary instruction sequence 64 of FIG. 2 as it is processed by a processor employing a BTIC, such as the processor 10 of FIG. 1. The columns in the timing diagram (labeled 0, 1, 2, . . . 8) each represents a single processor clock cycle. The rows in the timing diagram (labeled "Next Fetch," "$FE_1$," "$FE_2$," and "$FE_3$") indicate the contents of a "next fetch" indicator 82 and the execution pipeline stages $FE_1$, $FE_2$, and $FE_3$ during each processor clock cycle. In this example, the "next fetch" indicator 82 indicates the next instruction that will be fetched by the processor during the next processor clock cycle in the execution pipeline stage $FE_1$. In this manner, the progression of instructions through the execution pipeline stages over the course of several clock cycles is shown.

FIG. 3 further illustrates the BTIC 50 of FIG. 1 employed for storing entries corresponding to branch instructions detected in the exemplary instruction sequence 64. The BTIC 50 includes as part of each BTIC entry a next instruction fetch address field and a branch target instruction field. The branch target instruction field stores a copy of one or more instructions to which a corresponding branch instruction is predicted to transfer program control. The next instruction fetch address field stores an address of the next instruction following the branch target instruction(s) in the branch target instruction field. The use of the next instruction fetch address field and the branch target instruction field in eliminating a pipeline bubble is discussed in greater detail below. It is to be understood that the example timing diagram illustrated in FIG. 3 assumes that the subroutine call instruction $Instr_1$ has already been detected once, resulting in establishment of a BTIC entry 84 in the BTIC 50 populated with the appropriate next instruction fetch address and branch target instruction values.

With continuing reference to FIG. 3, processing begins at processor clock cycle 0 with $Instr_0$, the first instruction in the exemplary instruction sequence 64 of FIG. 2. At processor clock cycle 0, the next fetch indicator 82 indicates that the instruction $Instr_0$ will be fetched next for processing. At processor clock cycle 1, the instruction $Instr_0$ has proceeded to the execution pipeline stage $FE_1$ for fetching. The next fetch indicator 82 has also updated to indicate that the subroutine call instruction $Instr_1$, which is sequential to the instruction $Instr_0$ in the exemplary instruction sequence 64, will be fetched next. During processor clock cycle 2, the instruction $Instr_0$ is decoded in the execution pipeline stage $FE_2$, while the instruction $Instr_1$ is fetched in the execution pipeline stage $FE_1$. At this point, the instruction $Instr_1$ is not recognized as a branch instruction. Consequently, the next fetch indicator 82 is updated in processor clock cycle 2 to indicate that the next instruction sequential to the instruction $Instr_1$ (i.e., the instruction $Instr_2$) will be fetched next.

In processor clock cycle 3, an execution pipeline bubble occurs. The instruction $Instr_0$ has reached the execution pipeline stage $FE_3$. The subroutine call instruction $Instr_1$ is decoded in the execution pipeline stage $FE_2$, where it is identified as a predicted taken branch. An instruction fetch redirect is initiated to flush any incorrectly fetched instructions from the execution pipeline, and to fetch the correct branch target instruction for the subroutine call instruction $Instr_1$. Because the correct branch target instruction for the subroutine call instruction $Instr_1$ (i.e., the instruction $Instr_X$) cannot be fetched until the next processor clock cycle, a pipeline bubble indicated in FIG. 3 as "$Instr_2$ (bubble)" is introduced in the execution pipeline stage $FE_1$. As seen in FIG. 3, the instruction $Instr_2$, which is fetched into $FE_1$, occupies the pipeline bubble during processor clock cycle 3.

If the processor did not employ the BTIC 50, the execution pipeline bubble would propagate within the execution pipeline over the following processor clock cycles, resulting in decreased processor throughput and inefficient power consumption. However, in this example, the BTIC 50 is available to eliminate the execution pipeline bubble. During processor clock cycle 3, the BTIC 50 is accessed, and the previously-established BTIC entry 84 for the subroutine call instruction $Instr_1$ is located. The BTIC 50 provides the contents of the next instruction fetch address field for the BTIC entry 84. Accordingly, the next fetch indicator 82 is updated to indicate that the instruction $Instr_{X+1}$ (i.e., the instruction following the branch target instruction $Instr_X$) will be fetched next, as indicated by arrow 86.

With continuing reference to FIG. 3, during processor clock cycle 4, the instruction $Instr_0$ proceeds to the remaining issue and execution stages in a remainder of the execution pipeline 88, while the instruction $Instr_1$ reaches the execution pipeline stage $FE_3$. The instruction $Instr_{X+1}$ is fetched in the execution pipeline stage $FE_1$. Note that the execution pipeline bubble introduced in processor clock cycle 3 is still present, having reached the execution pipeline stage $FE_2$. However, when the execution pipeline bubble reaches the execution stage $FE_3$ during processor clock cycle 5, the BTIC 50 supplies the branch target instructions (e.g., $Instr_X$) from the BTIC entry 84 for the subroutine call instruction $Instr_1$ to the execution pipeline stage $FE_3$, as indicated by arrow 90. In this manner, the pipeline bubble is eliminated, and the remaining instructions move through the pipeline during processor clock cycles 6 and 7.

As with other types of branch instructions, a subroutine return instruction will always result in a BTIC cache miss when the subroutine return instruction is first encountered. Furthermore, because a subroutine may be called from multiple branch instructions at different points within a program, a BTIC entry for a subroutine return instruction may frequently contain incorrect branch target instructions. Accordingly, the pipeline bubble reduction circuit 12 of FIG. 1 may be provided to reduce an occurrence of a pipeline bubble when processing a subroutine return instruction.

Figure 4A:
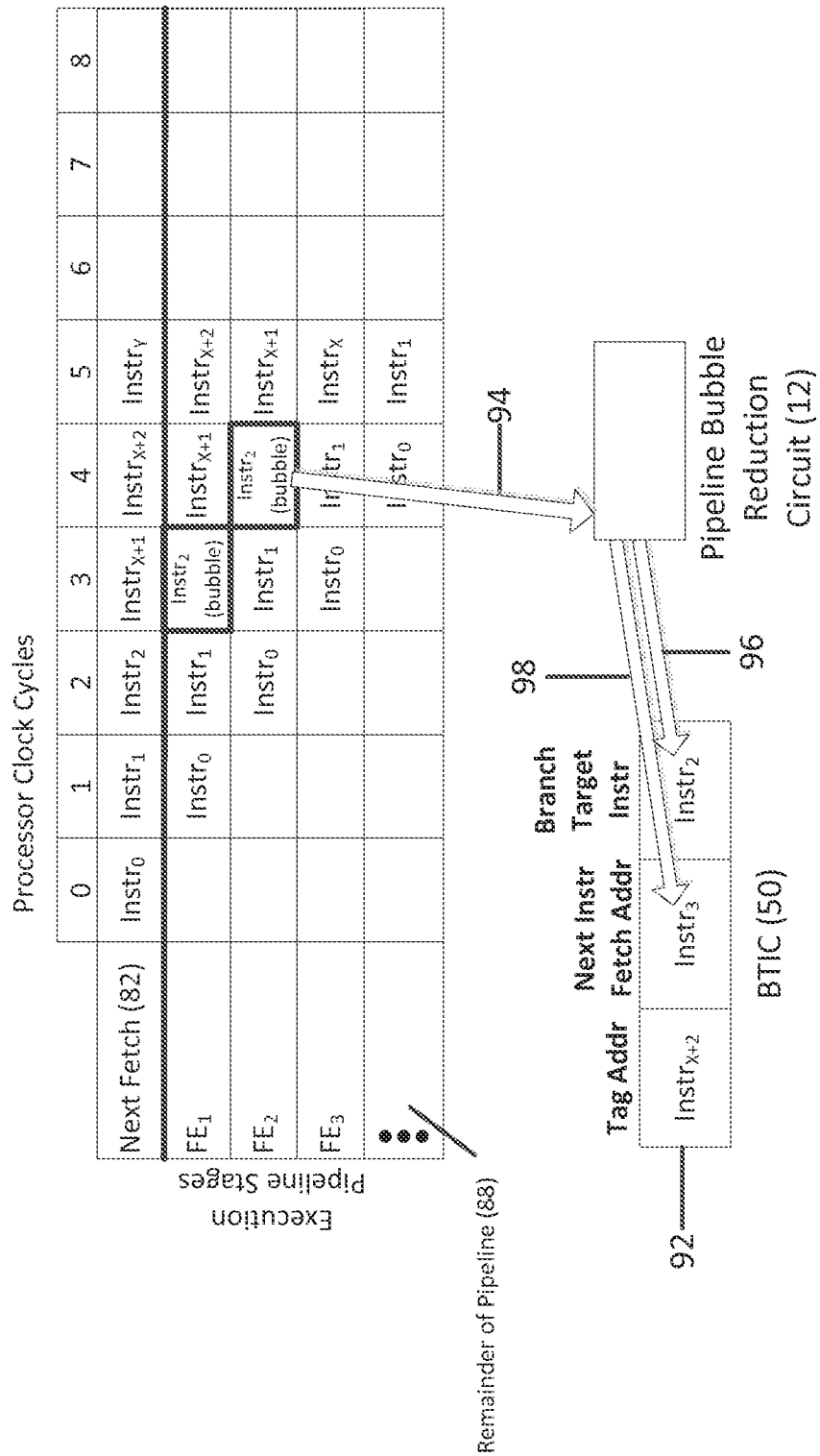
FIGS. 4A and 4B are timing diagrams showing the exemplary instruction sequence of FIG. 2 being processed in a processor utilizing the pipeline bubble reduction circuit of FIG. 1, illustrating elimination of a pipeline bubble resulting from encountering a subroutine return instruction.
Figure 4B:
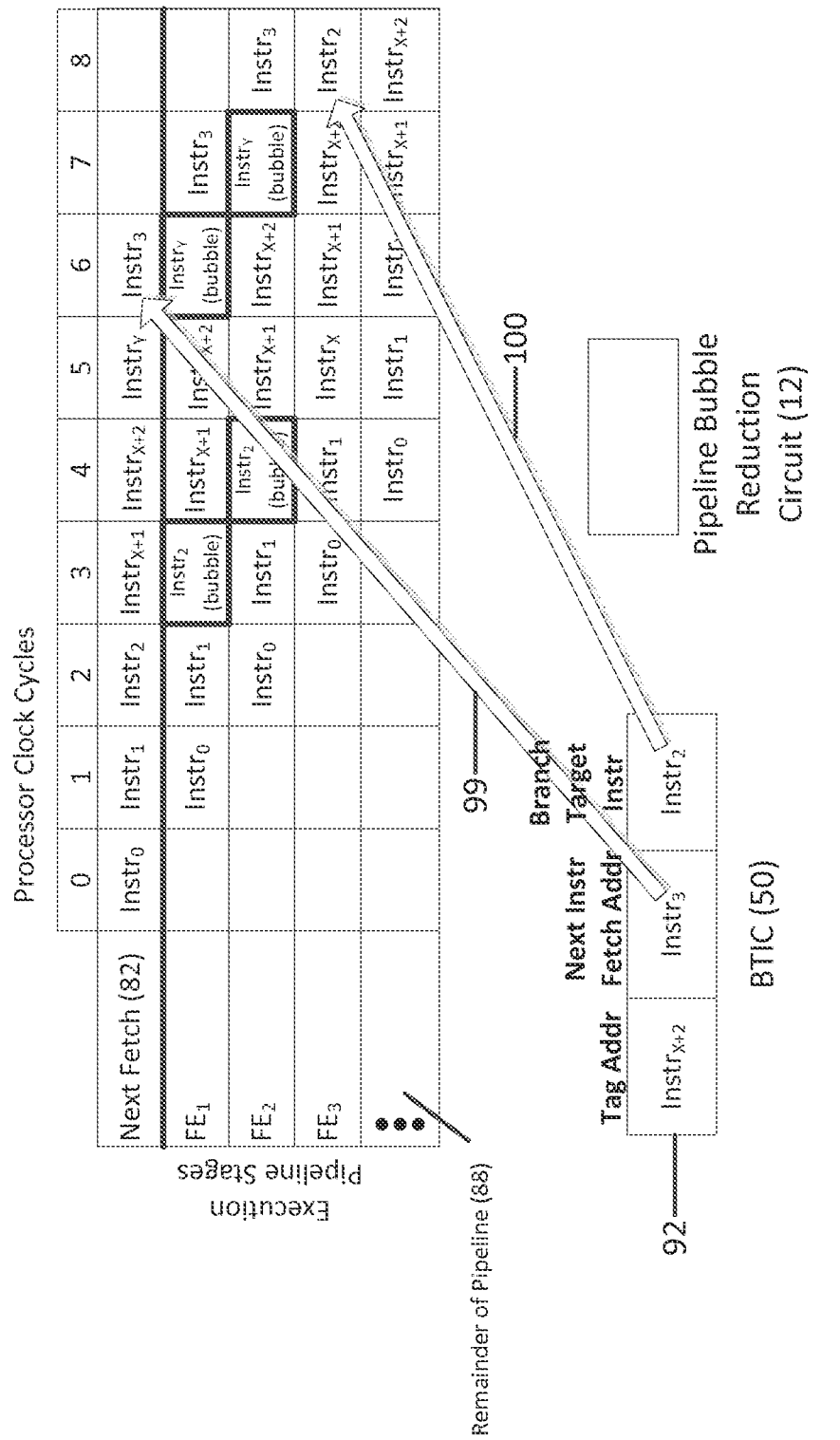

In this regard, FIGS. 4A and 4B are timing diagrams illustrating the exemplary instruction sequence 64 of FIG. 2 being processed by the processor 10 of FIG. 1 utilizing the pipeline bubble reduction circuit 12. FIG. 4A shows the establishment of a BTIC entry for a subroutine return instruction upon detection of a subroutine call instruction, while FIG. 4B illustrates the established BTIC entry being used to eliminate a pipeline bubble. As with FIG. 3, the columns (labeled 0, 1, 2, . . . 8) in the timing diagrams of FIGS. 4A and 4B each represents a single processor clock cycle, while the rows in each timing diagram indicate the contents of a "next fetch" indicator 82 and the execution pipeline stages $FE_1$, $FE_2$, and $FE_3$ during each processor clock cycle. The next fetch indicator 82 shows the next instruction that will be fetched by the processor during the next processor clock cycle in the execution pipeline stage $FE_1$. FIGS. 4A and 4B also illustrate the pipeline bubble reduction circuit 12 and the BTIC 50. For purposes of clarity and brevity, it is assumed that establishment of a BTIC entry for the subroutine call instruction $Instr_1$ takes place as described in FIG. 3, and is not shown in or described again in conjunction with FIGS. 4A and 4B. While the example illustrated in FIGS. 4A and 4B employs an instruction fetch width of one instruction, it is to be understood that some embodiments may provide an instruction fetch width of greater than one instruction.

With reference to FIG. 4A, at processor clock cycle 0, the next fetch indicator 82 indicates that the instruction $Instr_0$ (the first instruction in the exemplary instruction sequence 64 of FIG. 2) will be fetched next for processing. At processor clock cycle 1, the instruction $Instr_0$ has proceeded to the execution pipeline stage $FE_1$ for fetching, and the next fetch indicator 82 is updated to indicate that the subroutine call instruction $Instr_1$, which is sequential to the instruction $Instr_0$ in the exemplary instruction sequence 64, will be fetched next. During processor clock cycle 2, the instruction $Instr_0$ is decoded in the execution pipeline stage $FE_2$, while the subroutine call instruction $Instr_1$ is fetched in the execution pipeline stage $FE_1$. At this point, the subroutine call instruction $Instr_1$ is not recognized as a branch instruction. Consequently, the next fetch indicator 82 is updated in processor clock cycle 2 to indicate that the next instruction sequential to the instruction $Instr_1$ (i.e., the instruction $Instr_2$) will be fetched next.

With continuing reference to FIG. 4A, in processor clock cycle 3, a pipeline bubble occurs. The instruction $Instr_0$ has reached the execution pipeline stage $FE_3$, and the subroutine call instruction $Instr_1$ is decoded in the execution pipeline stage $FE_2$, where it is identified as a predicted taken branch. An instruction fetch redirect is initiated to flush any incorrectly fetched instructions (i.e., the instruction $Instr_2$) from the execution pipeline, and to fetch the correct branch target instruction for the subroutine call instruction $Instr_1$ as illustrated in FIG. 3.

However, rather than dispose of the incorrectly fetched instructions, the pipeline bubble reduction circuit 12 utilizes the instructions fetched when the subroutine call instruction $Instr_1$ was encountered to establish a BTIC entry 92 for the subroutine return instruction $Instr_{X+2}$. In particular, in processor clock cycle 4, the pipeline bubble reduction circuit 12 retrieves the fetched instruction $Instr_2$ from the $FE_2$ stage of the execution pipeline (as indicated by arrow 94), and stores the fetched instruction $Instr_2$ in the BTIC entry 92 as a branch target instruction, as indicated by arrow 96. Based on the size of the instruction $Instr_2$, the pipeline bubble reduction circuit 12 also calculates the address of the instruction $Instr_3$ sequential to the instruction $Instr_2$, and stores the address of the instruction $Instr_3$ in the BTIC entry 92 as a next instruction fetch address, as indicated by arrow 98. Processing then continues in much the same manner as described above in FIG. 3, with the pipeline bubble associated with the subroutine call instruction $Instr_1$ being eliminated using the BTIC 50 in processor clock cycle 5.

Referring now to FIG. 4B, operations for eliminating a pipeline bubble associated with the subroutine return instruction $Instr_{X+2}$ are illustrated. In processor clock cycle 6, a pipeline bubble occurs in the execution pipeline stage $FE_1$ when the subroutine return instruction $Instr_{X+2}$ is decoded in the execution pipeline stage $FE_2$ and identified as a predicted taken branch, triggering an instruction fetch redirect. When the pipeline bubble reduction circuit 12 detects the subroutine return instruction $Instr_{X+2}$, the BTIC 50 is accessed, and the BTIC entry 92 for the subroutine return instruction $Instr_{X+2}$ is located. The BTIC 50 provides the contents of the next instruction fetch address field for the BTIC entry 92 to the next fetch indicator 82, which is updated to indicate that the instruction $Instr_3$ (i.e., the instruction following the branch target instruction $Instr_2$) will be fetched next, as indicated by arrow 99. Two processor clock cycles later, during processor clock cycle 8, the BTIC 50 supplies the branch target instruction (e.g., $Instr_2$) from the BTIC entry 92 for the subroutine return instruction $Instr_{X+2}$ to the execution pipeline stage $FE_3$, as indicated by arrow 100. In this manner, the pipeline bubble is eliminated.

In some embodiments, the subroutine call detection circuit 56 (shown in FIG. 1) of the pipeline bubble reduction circuit 12 may be operative to detect the subroutine call instruction $Instr_1$. Some embodiments provide that the BTIC entry 92 for the subroutine return instruction $Instr_{X+2}$ may be established and populated by the BTIC entry establishing circuit 58 of the pipeline bubble reduction circuit 12. Some embodiments may provide that the subroutine return instruction $Instr_{X+2}$ is detected by the subroutine return detection circuit 60 of the pipeline bubble reduction circuit 12. In some embodiments, the BTIC consuming circuit 62 of the pipeline bubble reduction circuit 12 may detect a BTIC hit for the subroutine return instruction $Instr_{X+2}$, and may access the BTIC 50 to retrieve the next instruction fetch address field and the branch target instruction in the BTIC entry 92.

As illustrated in FIGS. 4A and 4B, a detection of a subroutine call instruction may trigger the creation of a BTIC entry, such as the BTIC entry 92, for a corresponding subroutine return instruction. Upon its creation, the BTIC entry may be "tagged" with the subroutine return instruction address, which may facilitate retrieval of the BTIC entry when the subroutine return instruction is encountered. For example, a detection of the subroutine return instruction in some embodiments results in a search of the BTIC to determine whether a BTIC entry having the address of the subroutine return instruction as a tag exists in the BTIC.

Figure 5:
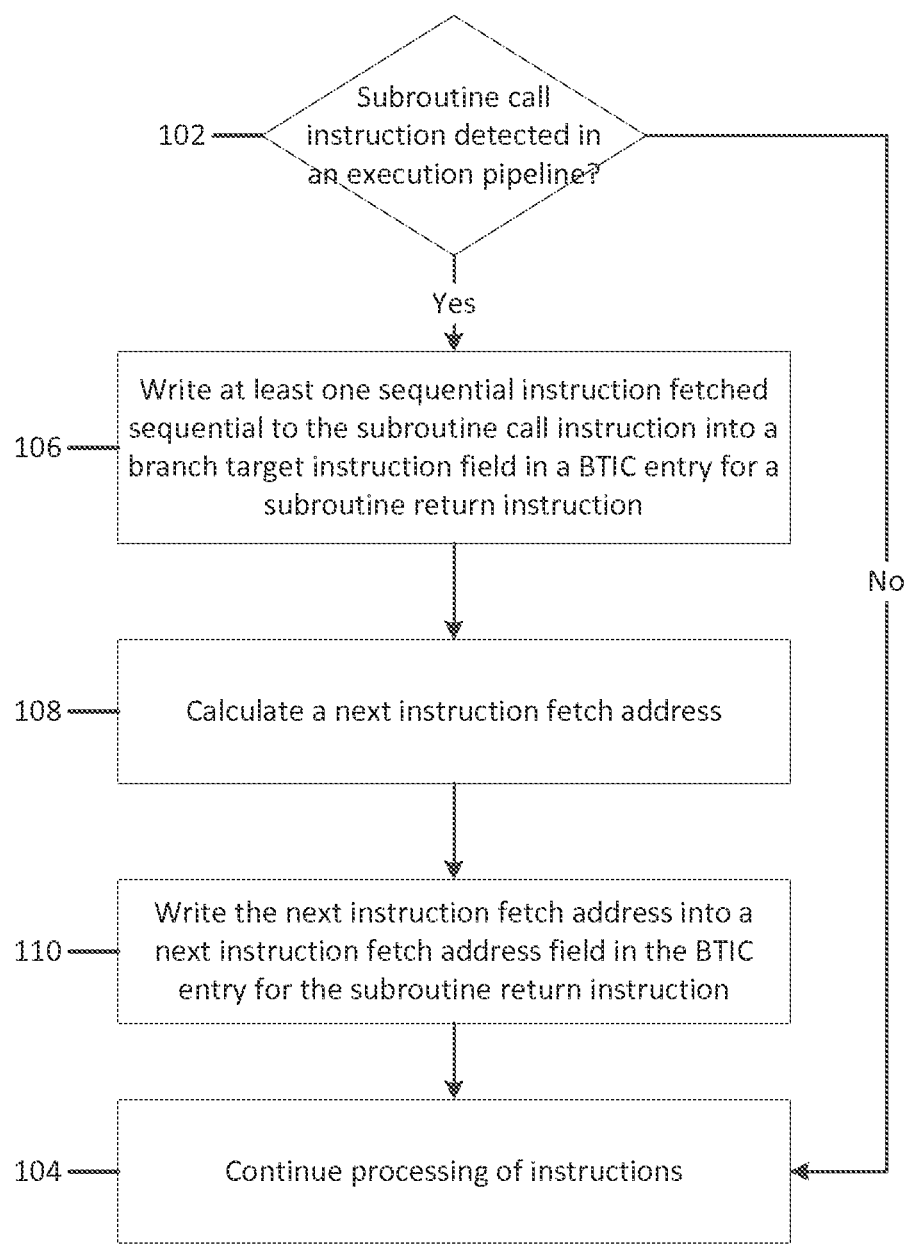
FIG. 5 is a flowchart showing exemplary operations for establishing a BTIC entry for a subroutine return instruction to reduce an occurrence of an execution pipeline bubble.

Some embodiments may provide alternate mechanisms for retrieving a BTIC entry for a subroutine return address. For example, in some embodiments, the BTIC may be linked to a link stack, such as the link stack 28 of FIG. 1. When a subroutine call instruction is detected, a BTIC entry may be created for the subroutine return instruction as described above. Additionally, a link stack entry for the subroutine call instruction in the link stack may be updated to indicate that the BTIC entry exists for the subroutine return instruction. Upon detection of the subroutine return instruction, the appropriate BTIC entry may be determined by examining the link stack entry for the subroutine call instruction. Some embodiments may provide that a link stack entry directly indicates a corresponding BTIC, such that a given link stack entry always corresponds to a particular BTIC entry. In some embodiments, a link stack entry may indicate a corresponding BTIC entry indirectly by, for example, including a pointer to the corresponding BTIC entry. FIG. 5 is a flowchart illustrating exemplary operations carried out by the pipeline bubble reduction circuit 12 of FIG. 1 for establishing a BTIC entry for a subroutine return instruction to reduce an occurrence of a pipeline bubble, with reference to FIGS. 1 and 2. The process in this example begins with the pipeline bubble reduction circuit 12 determining whether a subroutine call instruction has been detected in the execution pipeline 20 (block 102). As noted above, some embodiments may provide that a branch instruction, such as a subroutine call instruction, cannot be detected until the branch instruction is decoded. Accordingly, in some embodiments, the pipeline bubble reduction circuit 12 may communicate with an execution pipeline stage, such as the execution pipeline stage $FE_2$, in order to detect a subroutine call instruction.

If no subroutine call instruction is detected at block 102, processing of instructions continues at block 104. However, if a subroutine call instruction is detected in the execution pipeline 20, the pipeline bubble reduction circuit 12 has identified an opportunity to establish a BTIC entry for the subroutine return instruction corresponding to the detected subroutine call instruction. Note that at the time the subroutine call instruction is identified, at least one sequential instruction sequential to the subroutine call instruction has been or is being fetched. Because a subroutine return instruction for the subroutine will transfer program control back to the at least one sequential instruction after the subroutine is executed, the at least one sequential instruction may be cached as the branch target instruction for the subroutine return instruction. Therefore, the pipeline bubble reduction circuit 12 writes the at least one sequential instruction fetched sequential to the subroutine call instruction as a branch target instruction in a BTIC entry for the subroutine return instruction (block 106). In some embodiments, the at least one sequential instruction is written as a branch target instruction in a BTIC entry by a BTIC entry establishing circuit, such as the BTIC entry establishing circuit 58 of the pipeline bubble reduction circuit 12.

Next, the pipeline bubble reduction circuit 12 calculates a next instruction fetch address (block 108). The next instruction fetch address indicates the location of a next instruction to be fetched and executed after the at least one sequential instruction stored as the branch target instruction for the subroutine return instruction. In some embodiments, operations for calculating the next instruction fetch address may depend on a presence or absence of a branch instruction within the at least one sequential instruction. As a non-limiting example, if the at least one sequential instruction includes only non-branch instructions, the pipeline bubble reduction circuit 12 may calculate the next instruction fetch address by calculating an address of an instruction that follows a last one of the at least one sequential instruction. This may be accomplished, for instance, by summing an instruction address of a first of the at least one sequential instruction and an offset equal to a byte size of the at least one sequential instruction. As a further non-limiting example, if a last one of the at least one sequential instruction is a branch instruction, the pipeline bubble reduction circuit 12 may calculate the next instruction fetch address by calculating an address of a target instruction of the branch instruction. As an additional non-limiting example, if one or more of the at least one sequential instruction prior to a last one of the at least one sequential instruction is a branch instruction, and a target instruction of the branch instruction is a non-branch instruction, the pipeline bubble reduction circuit 12 may calculate the next instruction fetch address by calculating an address of an instruction that follows the target instruction of the branch instruction.

After calculating the next instruction fetch address, the pipeline bubble reduction circuit 12 writes the next instruction fetch address into a next instruction fetch address field in the BTIC entry for the subroutine return instruction (block 110). The BTIC entry for the subroutine return instruction is then available to eliminate a pipeline bubble that may otherwise propagate through the execution pipeline after the subroutine return instruction is encountered. Processing then continues at block 104.

Figure 6:
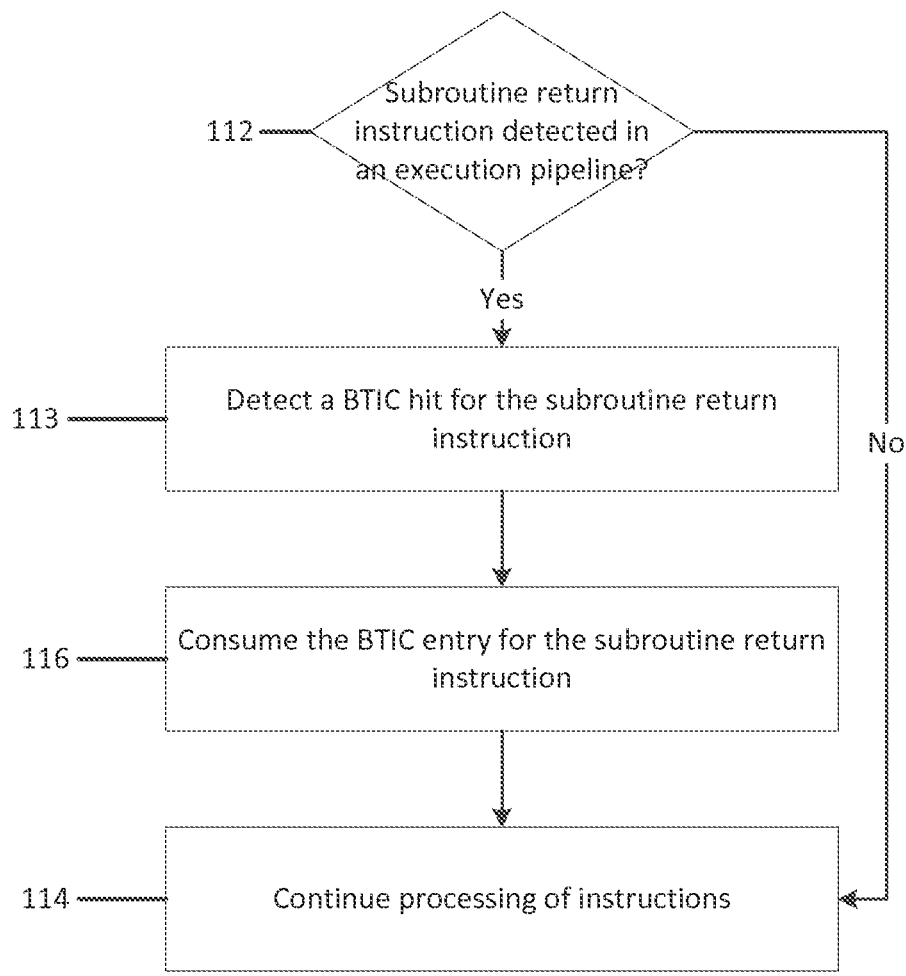
FIG. 6 is a flowchart illustrating exemplary operations for consuming a BTIC entry for a subroutine return instruction in response to detecting the subroutine return instruction.

FIG. 6 is a flowchart illustrating exemplary operations carried out by the pipeline bubble reduction circuit 12 of FIG. 1 for consuming a BTIC entry for a subroutine return instruction in response to detecting the subroutine return instruction. The pipeline bubble reduction circuit 12 first determines whether a subroutine return instruction has been detected in the execution pipeline 20 (block 112). Some embodiments may provide that a branch instruction, such as a subroutine return instruction, cannot be detected until the branch instruction is decoded. Accordingly the pipeline bubble reduction circuit 12 in some embodiments may communicate with an execution pipeline stage, such as the execution pipeline stage $FE_2$, in order to detect a subroutine return instruction.

If a subroutine return instruction is not detected, processing of instructions continues at block 114. If a subroutine return instruction is detected, the pipeline bubble reduction circuit 12 detects a BTIC hit for the subroutine return instruction (block 113). The pipeline bubble reduction circuit 12 then consumes the BTIC entry for the subroutine return instruction (block 116). In some embodiments, consuming the BTIC entry for the subroutine return instruction eliminates a pipeline bubble associated with the subroutine return instruction by providing the next instruction fetch address and the branch target instructions to the execution pipeline. Processing then continues at block 114.

Figure 7A:
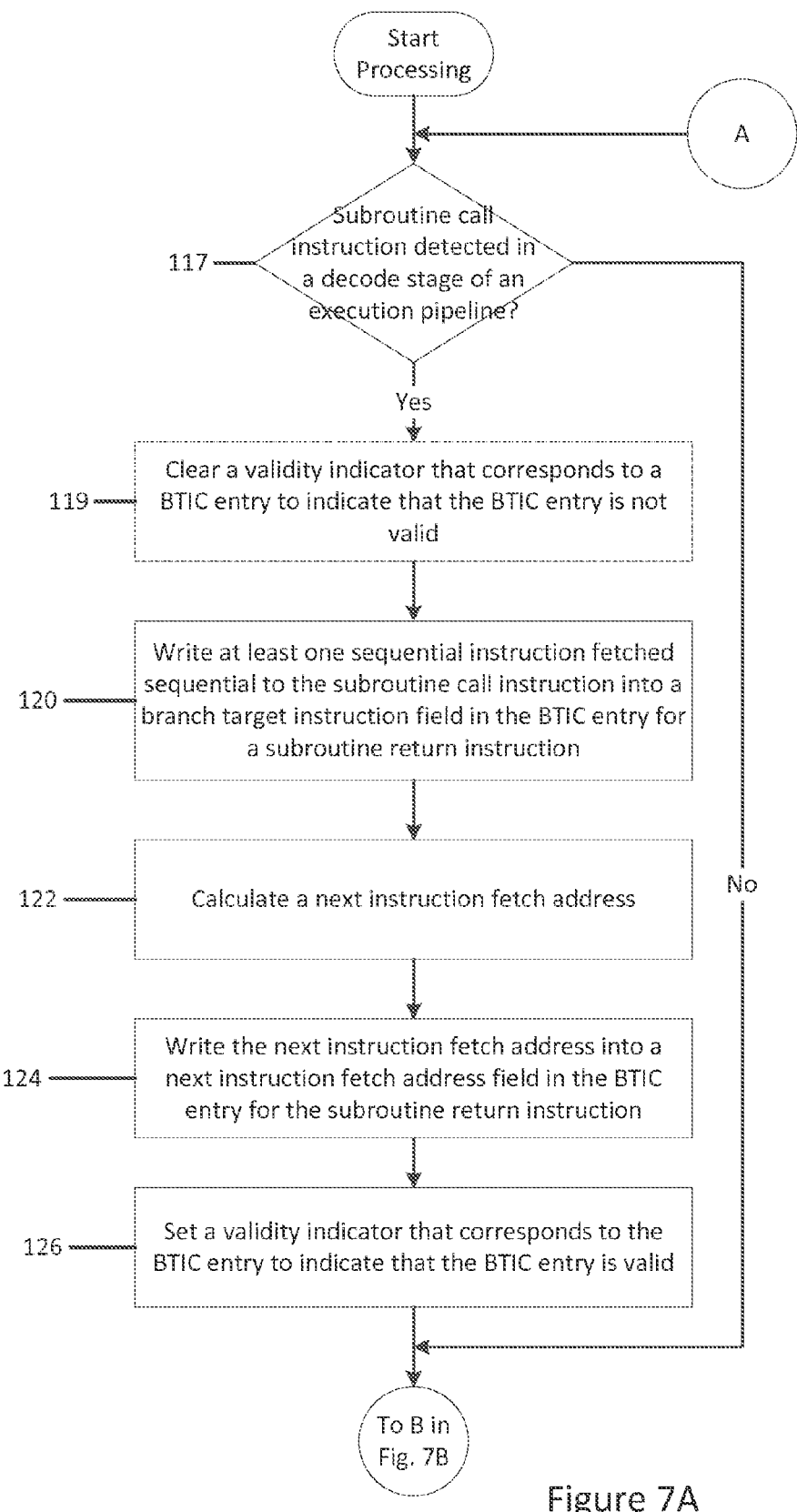
FIGS. 7A and 7B are flowcharts illustrating, in more detail, exemplary operations for establishing and consuming a BTIC entry to reduce an occurrence of a pipeline bubble.
Figure 7B:
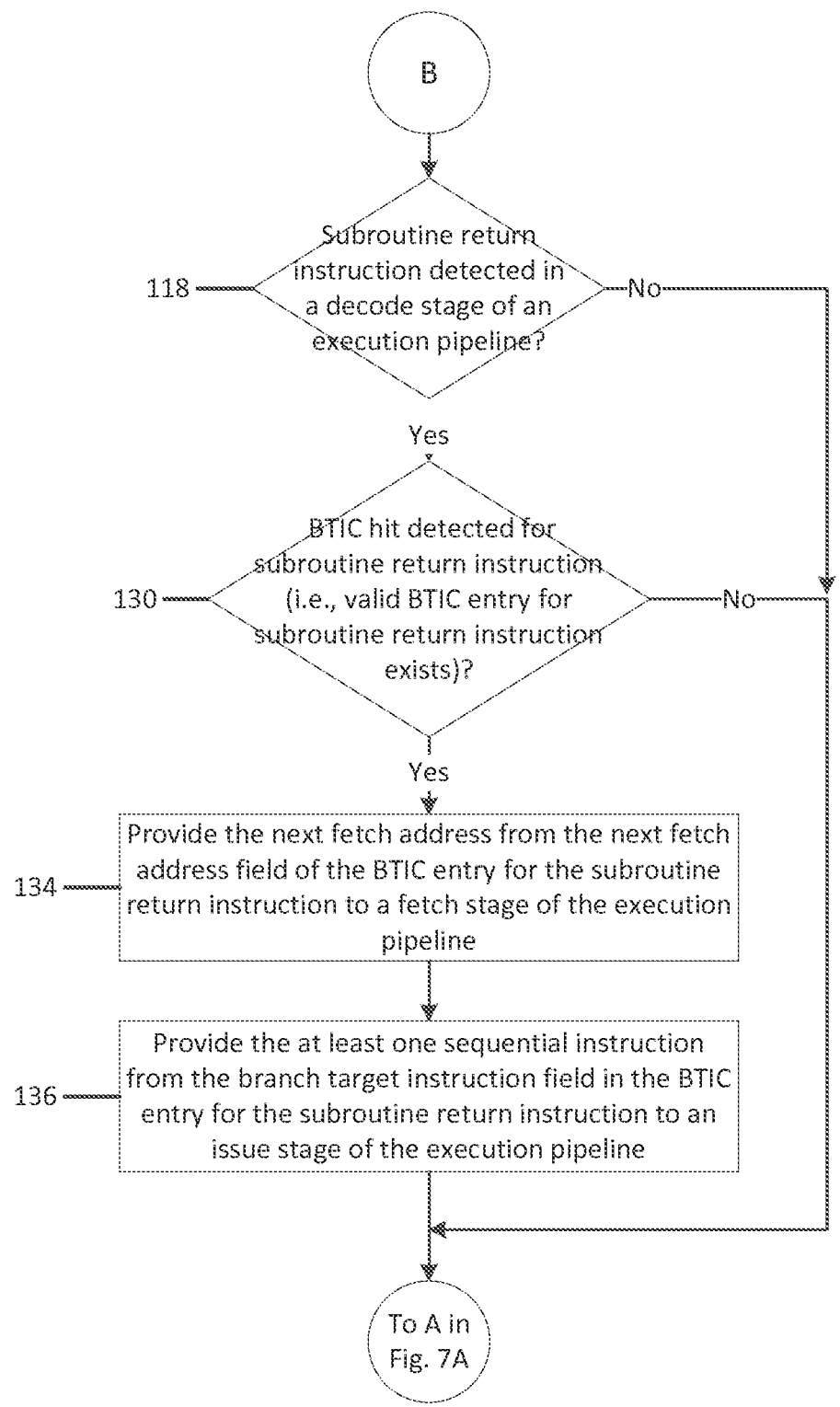

More detailed exemplary operations carried out by the pipeline bubble reduction circuit 12 of FIG. 1 for establishing and consuming a BTIC entry to reduce an occurrence of a pipeline bubble are shown in FIGS. 7A and 7B. FIG. 7A is a flowchart detailing exemplary operations related to establishing a BTIC entry to reduce an occurrence of a pipeline bubble, while FIG. 7B is a flowchart showing exemplary operations for consuming the BTIC entry for the subroutine return instruction to eliminate a pipeline bubble in an execution pipeline.

In FIG. 7A, the pipeline bubble reduction circuit 12 determines whether a subroutine call instruction has been detected in the execution pipeline 20 (block 117). An exemplary subroutine call instruction may include a branch-and-link (BL) instruction that places a return address of the subroutine call instruction into the link register 36, and sets the program counter 34 to an instruction address of a subroutine. In some embodiments, the pipeline bubble reduction circuit 12 may detect the subroutine call instruction in a decode stage of the execution pipeline 20, such as the decode stage $FE_2$.

If a subroutine call instruction is not detected at block 117, processing continues at block 118 of FIG. 7B. If the pipeline bubble reduction circuit 12 detects a subroutine call instruction, operations for establishing a BTIC entry are carried out. In some embodiments, the BTIC entry may be established in a buffer separate from the BTIC itself, and subsequently copied into the BTIC. Alternatively, some embodiments may provide that the BTIC entry is established by writing directly into the BTIC. In the latter case, a validity indicator that corresponds to the BTIC entry may first be cleared, to indicate that the BTIC entry is not yet valid for consumption (block 119). It is to be understood that the operations of block 119 may not be necessary in embodiments that employ a separate buffer for establishing a BTIC entry.

Next, at least one sequential instruction fetched sequential to the subroutine call instruction is written as a branch target instruction in a BTIC entry for a subroutine return instruction (block 120). In some embodiments, the subroutine return instruction is a branch instruction that indicates a return from a subroutine called by the subroutine call instruction. Some embodiments may provide that the BTIC entry is dedicated for subroutine return instructions. The BTIC entry in some embodiments may correspond to a link stack entry in the link stack 28 storing a return address of the subroutine call instruction. In some embodiments, the at least one sequential instruction is written as a branch target instruction in a BTIC entry by a BTIC entry establishing circuit, such as the BTIC entry establishing circuit 58 of the pipeline bubble reduction circuit 12.

The pipeline bubble reduction circuit 12 then calculates a next instruction fetch address (block 122). The next instruction fetch address indicates a location of a next instruction to be fetched and executed after the at least one sequential instruction stored as the branch target instruction for the subroutine return instruction. In some embodiments, operations for calculating the next instruction fetch address may depend on a presence or absence of a branch instruction within the at least one sequential instruction. As a non-limiting example, if the at least one sequential instruction includes only non-branch instructions, the pipeline bubble reduction circuit 12 may calculate the next instruction fetch address by calculating an address of an instruction that follows a last one of the at least one sequential instruction. This may be accomplished, for instance, by summing an instruction address of a first of the at least one sequential instruction and an offset equal to a byte size of the at least one sequential instruction. As a further non-limiting example, if a last one of the at least one sequential instruction is a branch instruction, the pipeline bubble reduction circuit 12 may calculate the next instruction fetch address by calculating an address of a target instruction of the branch instruction. As an additional non-limiting example, if one or more of the at least one sequential instruction prior to the last one of the at least one sequential instruction is a branch instruction, and a target instruction of the branch instruction is a non-branch instruction, the pipeline bubble reduction circuit 12 may calculate the next instruction fetch address by calculating an address of an instruction that follows the target instruction of the branch instruction.

The next instruction fetch address is then written into a next instruction fetch address field in the BTIC entry for the subroutine return instruction (block 124). In some embodiments, the next instruction fetch address is written into a next instruction fetch address field in the BTIC entry by a BTIC entry establishing circuit, such as the BTIC entry establishing circuit 58 of the pipeline bubble reduction circuit 12. The pipeline bubble reduction circuit 12 sets the validity indicator that corresponds to the BTIC entry to indicate that the BTIC entry is valid for consumption (block 126). Processing then continues at block 118 of FIG. 7B.

Referring now to FIG. 7B, the pipeline bubble reduction circuit 12 determines whether a subroutine return instruction has been detected in the execution pipeline 20 (block 118). An exemplary subroutine return instruction may include a branch-to-link (BLR) instruction for setting the program counter 34 to a return address of the subroutine call instruction. Some embodiments may provide that the pipeline bubble reduction circuit 12 detects the subroutine return instruction in a decode stage of the execution pipeline 20, such as the decode stage $FE_2$ 40. If a subroutine return instruction is not detected, processing continues at block 117 of FIG. 7A, discussed in greater detail below. If the pipeline bubble reduction circuit 12 detects a subroutine return instruction, the pipeline bubble reduction circuit 12 next determines whether a BTIC hit for the subroutine return instruction (i.e., a valid BTIC entry for the subroutine return instruction in the BTIC) is detected (block 130). In some embodiments, detecting a BTIC hit for the subroutine return instruction may include evaluating a validity bit corresponding to the BTIC entry to determine whether the BTIC entry is valid. If no BTIC hit is detected for the subroutine return instruction in the BTIC, processing continues at block 117 of FIG. 7A.

If a BTIC hit is detected, the pipeline bubble reduction circuit 12 provides the next instruction fetch address from the next instruction fetch address field of the BTIC entry for the subroutine return instruction to a fetch stage of the execution pipeline 20, such as the sequential fetch stage $FE_1$ (block 134). The pipeline bubble reduction circuit 12 next provides the at least one sequential instruction stored as a branch target instruction(s) in the BTIC entry for the subroutine return address to a subsequent stage of the execution pipeline 20, such as the $FE_2$ stage 40 (block 136). In this manner, the pipeline bubble reduction circuit 12 in some embodiments may populate the at least one sequential instruction into the execution pipeline to eliminate a pipeline bubble associated with the subroutine return instruction. Processing continues at block 117 of FIG. 7A The pipeline bubble reduction circuit 12 according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
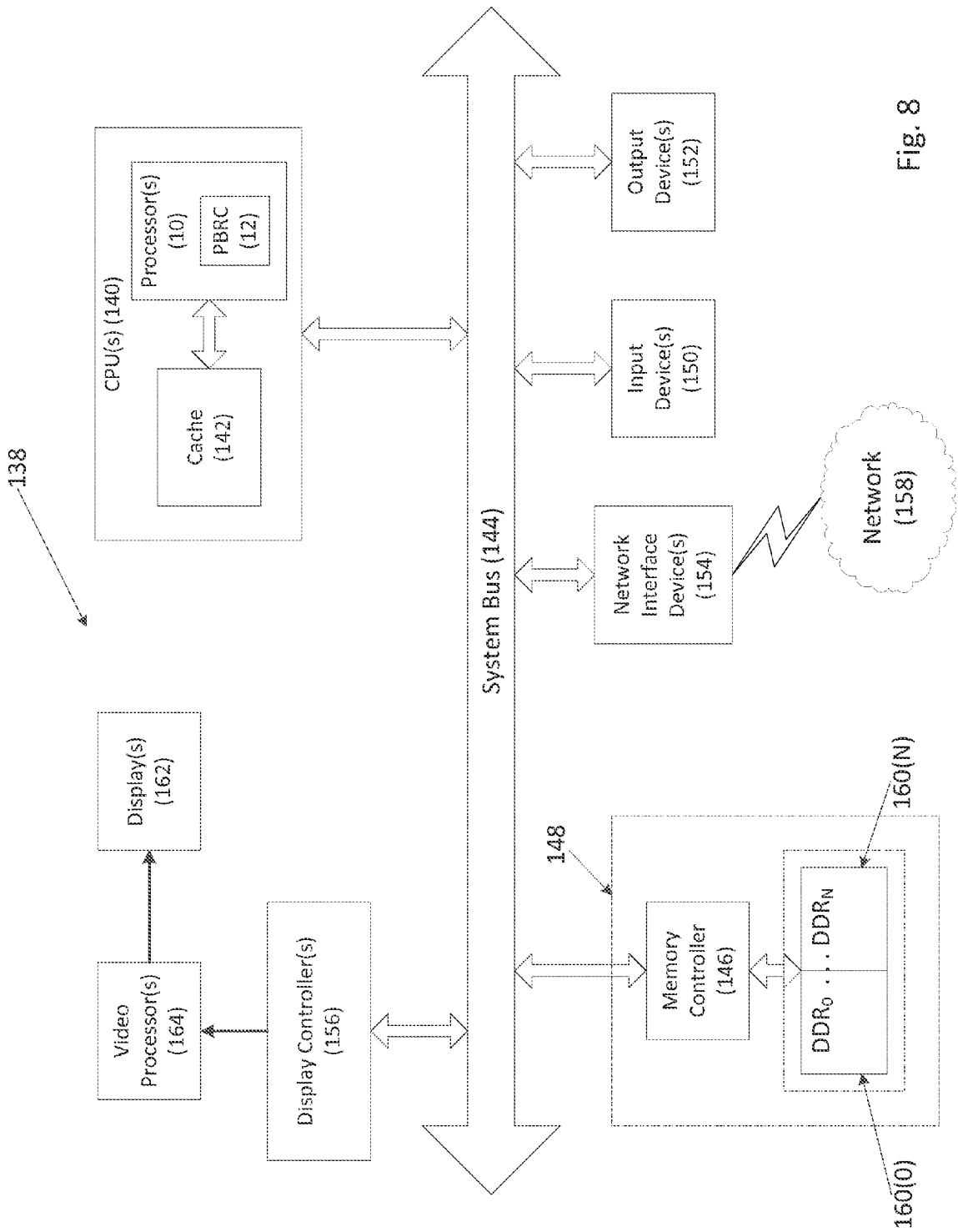
FIG. 8 is a diagram of an exemplary processor-based system that can include the pipeline bubble reduction circuit of FIG. 1, configured to establish a BTIC entry for a subroutine return instruction to reduce an occurrence of a pipeline bubble.

In this regard, FIG. 8 illustrates an example of a processor-based system 138 that can employ the pipeline bubble reduction circuit (PBRC) 12 illustrated in FIG. 1. In this example, the processor-based system 138 includes one or more CPU(s) 140. The CPU(s) 140 may include one or more processor(s) 10, and may have cache memory 142 coupled to the processor(s) 10 for rapid access to temporarily stored data. The processor(s) 10 may comprise the pipeline bubble reduction circuit 12. The CPU(s) 140 is coupled to a system bus 144 and can intercouple master and slave devices included in the processor-based system 138. As is well known, the CPU(s) 140 communicates with these other devices by exchanging address, control, and data information over the system bus 144. For example, the CPU(s) 140 can communicate bus transaction requests to a memory controller 146, as an example of a slave device. Although not illustrated in FIG. 8, multiple system buses 144 could be provided.

Other master and slave devices can be connected to the system bus 144. As illustrated in FIG. 8, these devices can include a memory system 148, one or more input devices 150, one or more output devices 152, one or more network interface devices 154, and one or more display controllers 156, as examples. The input device(s) 150 can include any type of input device, including but not limited to input keys, switches, voice processors, etc. The output device(s) 152 can include any type of output device, including but not limited to audio, video, other visual indicators, etc. The network interface device(s) 154 can be any device(s) configured to allow exchange of data to and from a network 158. The network 158 can be any type of network, including but not limited to a wired or wireless network, a private or public network, a local area network (LAN), a wide local area network (WLAN), and the Internet. The network interface device(s) 154 can be configured to support any type of communication protocol desired. The memory system 148 can include one or more memory units 160(0-N).

The CPU(s) 140 may also be configured to access the display controller(s) 156 over the system bus 144 to control information sent to one or more displays 162. The display controller(s) 156 sends information to the display(s) 162 to be displayed via one or more video processors 164, which process the information to be displayed into a format suitable for the display(s) 162. The display(s) 162 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), IC chip, or semiconductor die, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM). Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A method of establishing a branch target instruction cache (BTIC) entry for a subroutine return instruction in an execution pipeline to reduce an occurrence of a pipeline bubble, comprising:
    detecting a subroutine call instruction in an execution pipeline; and
    in response to detecting the subroutine call instruction, establishing a BTIC entry for a subroutine return instruction by:
        writing at least one sequential instruction fetched sequential to the subroutine call instruction as a branch target instruction in the BTIC entry for the subroutine return instruction;
        calculating a next instruction fetch address; and
        writing the next instruction fetch address into a next instruction fetch address field in the BTIC entry for the subroutine return instruction.

2. The method of claim 1, wherein the subroutine return instruction indicates a return from a subroutine called by the subroutine call instruction.

3. The method of claim 1, wherein the at least one sequential instruction is a non-branch instruction; and
    wherein calculating a next instruction fetch address comprises calculating an address of an instruction that follows a last one of the at least one sequential instruction.

4. The method of claim 1, wherein a last one of the at least one sequential instruction is a branch instruction; and
    wherein calculating a next instruction fetch address comprises calculating an address of a target instruction of the branch instruction.

5. The method of claim 1, wherein one or more of the at least one sequential instruction prior to a last one of the at least one sequential instruction is a branch instruction;
    wherein a target instruction of the branch instruction is a non-branch instruction; and
    wherein calculating a next instruction fetch address comprises calculating an address of an instruction that follows the target instruction of the branch instruction.

6. The method of claim 1, wherein establishing the BTIC entry further comprises setting a validity indicator that corresponds to the BTIC entry to indicate that the BTIC entry is valid.

7. The method of claim 1, wherein detecting the subroutine call instruction comprises detecting the subroutine call instruction in a decode stage in the execution pipeline.

8. The method of claim 1, further comprising:
    detecting the subroutine return instruction in the execution pipeline; and
    in response to detecting the subroutine return instruction:
        detecting a BTIC hit for the subroutine return instruction; and
        consuming the BTIC entry for the subroutine return instruction.

9. The method of claim 8, wherein detecting the BTIC hit for the subroutine return instruction comprises determining, based on a validity indicator that corresponds to the BTIC entry for the subroutine return instruction, that the BTIC entry for the subroutine return instruction is valid.

10. The method of claim 8, wherein consuming the BTIC entry eliminates one or more pipeline bubbles associated with the subroutine return instruction.

11. The method of claim 10, wherein consuming the BTIC entry comprises:
providing the next instruction fetch address from the next instruction fetch address field in the BTIC entry for the subroutine return instruction to a fetch stage of the execution pipeline; and
providing the at least one sequential instruction from the BTIC entry for the subroutine return instruction to a subsequent stage of the execution pipeline following the fetch stage.

12. The method of claim 8, wherein detecting the subroutine return instruction comprises detecting the subroutine return instruction in a decode stage in the execution pipeline.

13. The method of claim 1, wherein the next instruction fetch address comprises an address of an instruction immediately following the last one of the at least one sequential instruction.

14. The method of claim 1, wherein the BTIC entry for the subroutine return instruction corresponds to a link stack entry storing a return address of the subroutine call instruction.

15. The method of claim 1, wherein the subroutine call instruction comprises a branch-and-link (BL) instruction that is operative to place a return address of the subroutine call instruction into a link register (LR) and set a program counter to an instruction address of a subroutine.

16. The method of claim 1, wherein the subroutine return instruction comprises a branch-to-link (BLR) instruction for setting a program counter to a return address of the subroutine call instruction.

17. A pipeline bubble reduction circuit, comprising:
a subroutine call detection circuit configured to detect a subroutine call instruction in an execution pipeline; and
a branch target instruction cache (BTIC) entry establishing circuit configured to, in response to the subroutine call detection circuit detecting the subroutine call instruction:
write at least one sequential instruction fetched sequential to the subroutine call instruction as a branch target instruction in a BTIC entry for a subroutine return instruction;
calculate a next instruction fetch address; and
write the next instruction fetch address into a next instruction fetch address field in the BTIC entry for the subroutine return instruction.

18. The pipeline bubble reduction circuit of claim 17, comprising the BTIC entry establishing circuit further configured to set a validity indicator that corresponds to the BTIC entry to indicate that the BTIC entry is valid in response to the subroutine call detection circuit detecting the subroutine call instruction.

19. The pipeline bubble reduction circuit of claim 17, further comprising:
a subroutine return detection circuit configured to detect the subroutine return instruction in the execution pipeline; and
a BTIC consuming circuit configured to consume the BTIC entry for the subroutine return instruction in response to the subroutine return detection circuit detecting the subroutine return instruction.

20. The pipeline bubble reduction circuit of claim 19, comprising the subroutine return detection circuit configured to determine, based on a validity indicator that corresponds to the BTIC entry for the subroutine return instruction, that the BTIC entry for the subroutine return instruction is valid.

21. The pipeline bubble reduction circuit of claim 19, comprising the BTIC consuming circuit configured to:
provide the next instruction fetch address from the next instruction fetch address field in the BTIC entry for the subroutine return instruction to a fetch stage of the execution pipeline; and
provide the at least one sequential instruction from the branch target instruction in the BTIC entry for the subroutine return instruction to a subsequent stage of the execution pipeline following the fetch stage.

22. The pipeline bubble reduction circuit of claim 17 integrated into a semiconductor die.

23. The pipeline bubble reduction circuit of claim 17, further comprising a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the pipeline bubble reduction circuit is integrated.

24. A non-transitory computer-readable medium having stored thereon computer-executable instructions to cause a processor to implement a method of establishing a branch target instruction cache (BTIC) entry for a subroutine return instruction in an execution pipeline to reduce an occurrence of a pipeline bubble, the method comprising:
detecting a subroutine call instruction in an execution pipeline; and
in response to detecting the subroutine call instruction, establishing a BTIC entry for a subroutine return instruction by:
writing at least one sequential instruction fetched sequential to the subroutine call instruction as a branch target instruction in the BTIC entry for the subroutine return instruction;
calculating a next instruction fetch address; and
writing the next instruction fetch address into a next instruction fetch address field in the BTIC entry for the subroutine return instruction.

25. The non-transitory computer-readable medium of claim 24 having stored thereon the computer-executable instructions to cause the processor to implement the method wherein establishing the BTIC entry further comprises setting a validity indicator that corresponds to the BTIC entry to indicate that the BTIC entry is valid.

26. The non-transitory computer-readable medium of claim 24 having stored thereon the computer-executable instructions to cause the processor to implement the method further comprising:
detecting the subroutine return instruction in the execution pipeline; and
in response to detecting the subroutine return instruction, consuming the BTIC entry for the subroutine return instruction.

27. The non-transitory computer-readable medium of claim 26 having stored thereon the computer-executable instructions to cause the processor to implement the method wherein detecting the subroutine return instruction comprises determining, based on a validity indicator that corresponds to the BTIC entry for the subroutine return instruction, that the BTIC entry for the subroutine return instruction is valid.

28. The non-transitory computer-readable medium of claim 26 having stored thereon the computer-executable instructions to cause the processor to implement the method wherein consuming the BTIC entry comprises:
provided the next instruction fetch address from the next instruction fetch address field in the BTIC entry for the subroutine return instruction to a fetch stage of the execution pipeline; and
providing the at least one sequential instruction from the branch target instruction in the BTIC entry for the subroutine return instruction to a subsequent stage of the execution pipeline following the fetch stage.

* * * * *